United States Patent [19]

Strader

[11] 4,436,139

[45] Mar. 13, 1984

[54] METHOD AND APPARATUS FOR MANUFACTURE OF BRAKE DRUMS

[75] Inventor: Don S. Strader, Lansing, Mich.

[73] Assignee: Motor Wheel Corporation, Lansing, Mich.

[21] Appl. No.: 284,932

[22] Filed: Jul. 20, 1981

[51] Int. Cl.³ .................................................. B22D 19/08
[52] U.S. Cl. ..................................... 164/112; 164/334
[58] Field of Search .................................. 164/98–100, 164/103–107, 111, 112, 332–334; 249/91, 93; 264/275, 267

[56] References Cited

U.S. PATENT DOCUMENTS 2,136,447  11/1938  Jeune ........................................ 164/99

FOREIGN PATENT DOCUMENTS 46-39231  11/1971  Japan ........................................ 164/112

Primary Examiner—Kuang Y. Lin
Attorney, Agent, or Firm—Barnes, Kisselle, Raisch, Choate, Whittemore & Hulbert

[57] ABSTRACT

A method and apparatus for manufacture of brake drums, particularly tri-metallic drums of the type comprising a preformed brake liner, a mounting disc, and an aluminum shell cast around and joining the liner and disc into a rigid structure. The apparatus includes a mandrel with a plurality of springs for internally resiliently engaging the brake liner and locating the same in accurate position. The mounting disc is likewise accurately positioned on a mold surface, and the mold is closed to form a cavity for casting of the shell coaxially with the liner and disc.

6 Claims, 4 Drawing Figures

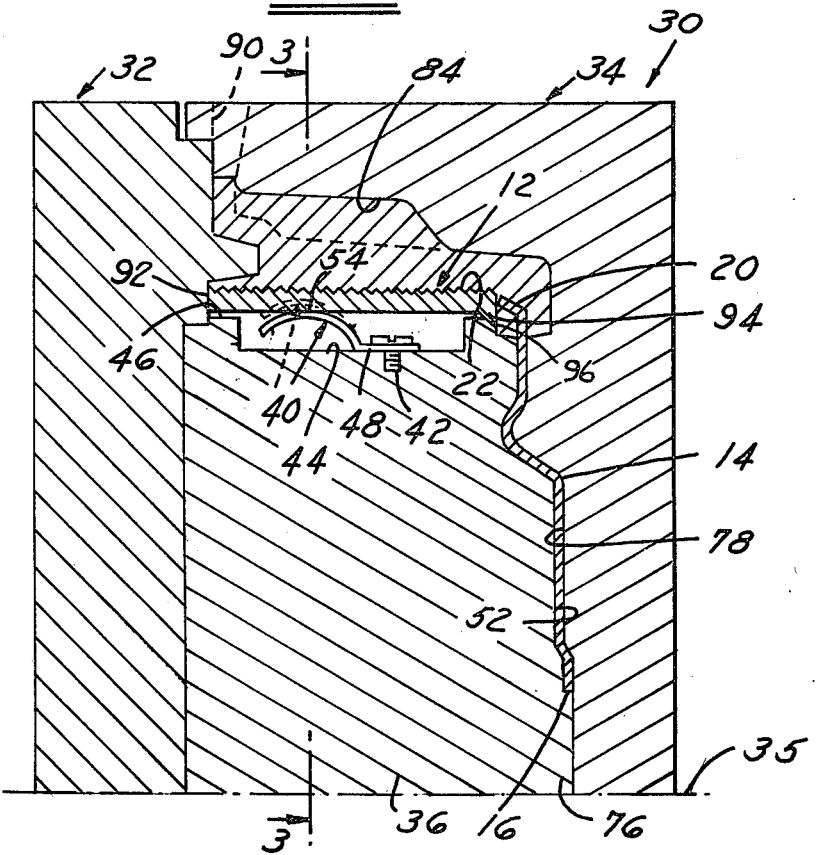
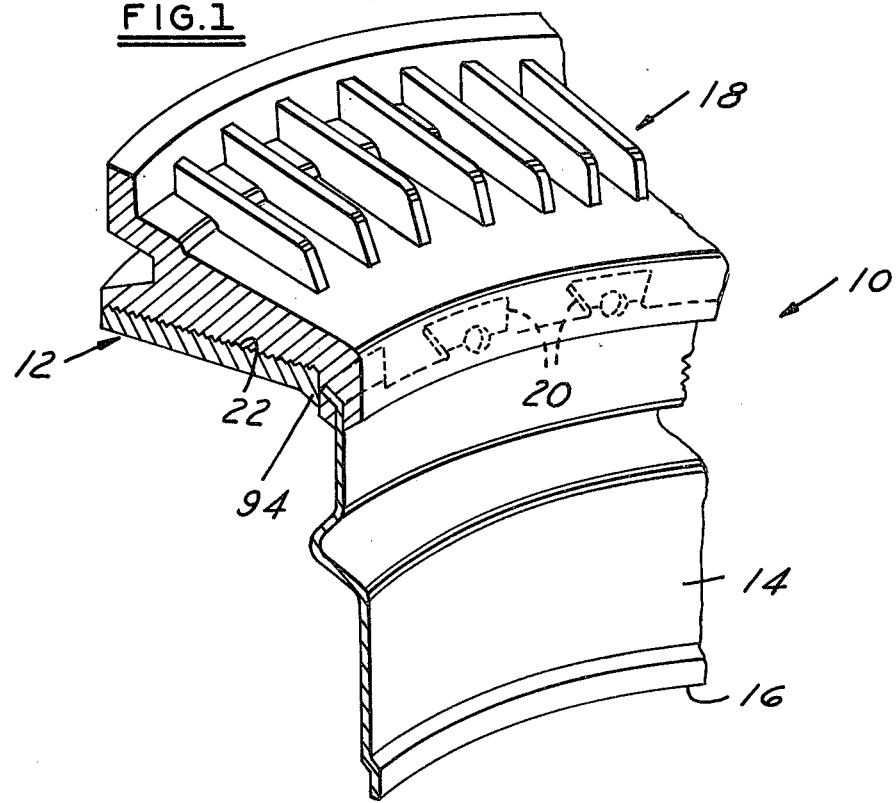

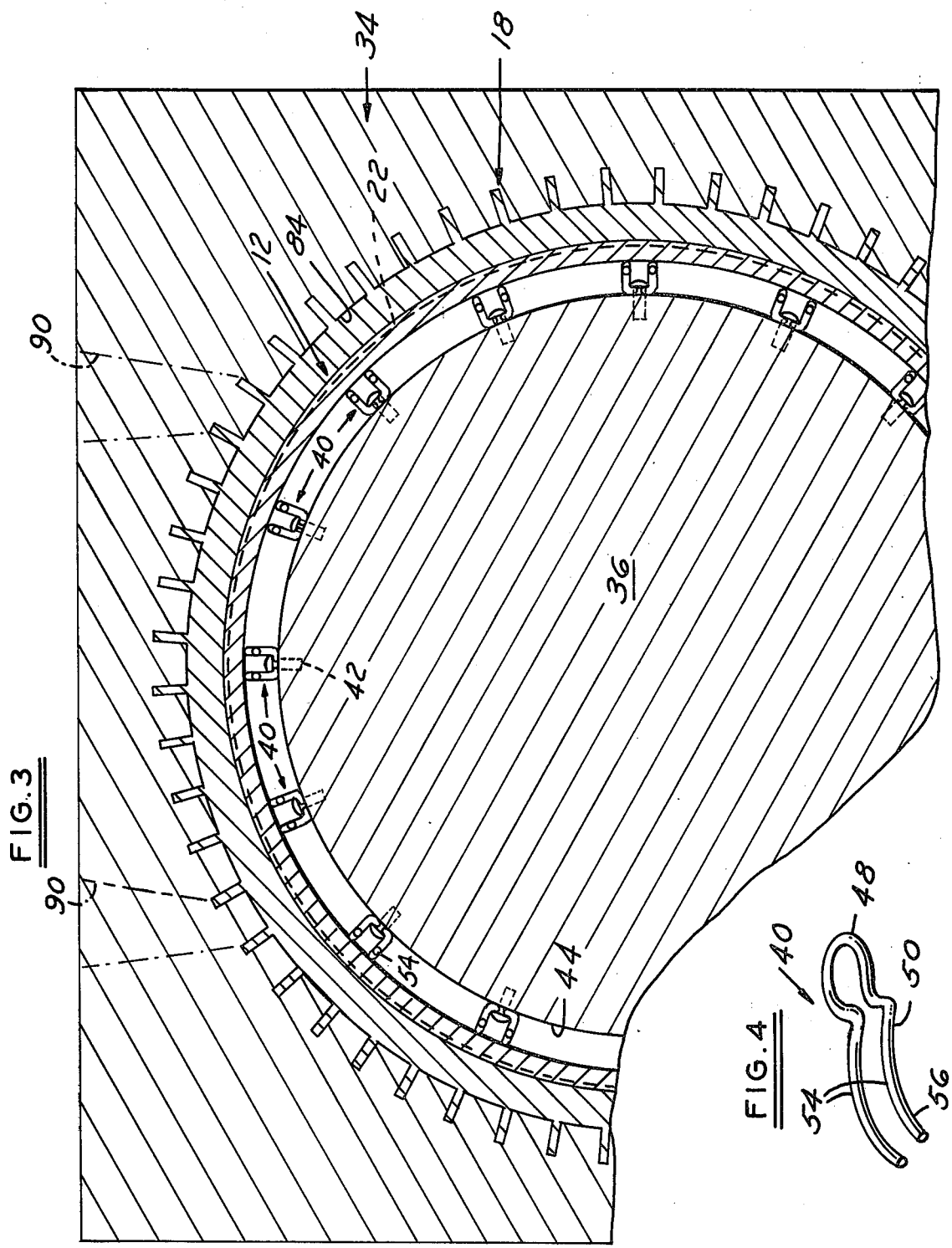

METHOD AND APPARATUS FOR MANUFACTURE OF BRAKE DRUMS

The present invention is directed to manufacture of brake drums for automotive vehicles or the like, and more particularly to an apparatus for casting a brake drum shell around a separate preformed brake liner. Yet more specifically, the invention is directed to a mold for casting so-called trimetallic brake drums of the type which comprise a cast iron brake liner, a jacket of aluminum cast externally of the liner and a steel disc drum back extending across the jacket for mounting the drum to a vehicle wheel hub.

In the casting of brake drums of the type which include a cast metal jacket surrounding a separately-formed brake liner, it is important that the braking surface of the liner be coaxial with the drum mounting structure. It has been common practice in the art to cast a jacket around a preformed liner and then machine the inside or braking liner surface to achieve the desired concentricity. However, the entire assembly may then be substantially out of balance, requiring a separate balancing operation. The problem of concentricity and balance are particularly acute in the case of trimetallic brake drums since both the liner and mounting disc should be coaxial with the aluminum jacket cast therearound.

Another important consideration in manufacture of brake drums of the subject type is the relative fragility of the brake liner. A relatively thin liner is preferred from the standpoint of economy. However, a thin liner tends to assume an oval shape under force of gravity, etc. and may crack when placed over a centering mandrel in a jacket casting mold. It is common practice, therefore, to make the liner thicker than would be otherwise desirable so as to better resist forces tending to make the liner non-circular, and also to resist cracking when the liner is forced over a mandrel of fixed, close-fitting diameter in the jacket casting mold.

An object of the present invention is to provide an improved method and apparatus for casting brake drums around a preformed liner wherein the brake liner, or the brake liner and mounting disc or back in the case of a trimetallic drum, are accurately positioned during the casting operation so as to eliminate the necessity for machining for concentricity as described above. Another object of the invention is to provide a method and apparatus of the described type which is adapted to receive and accommodate brake liners of mildly non-circular cross section, and to fixture such liners in a circular configuration for casting of a jacket therearound.

The invention, together with additional objects, features and advantages thereof, will be best understood from the following description, the appended claims and the accompanying drawings in which:

FIG. 1 is a fragmentary perspective sectional view of a trimetallic brake drum;

FIG. 2 is an elevational bisectional view of a mold for casting the brake drum of FIG. 1 in accordance with the invention;

FIG. 3 is a fragmentary sectional view taken substantially along the line 3—3 in FIG. 2; and FIG. 4 is a perspective view of one of the plurality of lines centering springs mounted in the mold of FIGS. 2 and 3.

FIG. 1 illustrates a trimetallic brake drum 10 which is generally conventional in construction, with the exception of the improved results obtained in accordance with the method and apparatus of the present invention. Brake drum 10 comprises wear resistant liner 12 of cast iron, for example, in the form of a circumferentially continuous cylindrical hoop or band. A mounting disc or backing plate 14 of stamped steel construction, for example, spans liner 12 and has a circular central opening 16 for piloting the drum over a vehicle hub. Although not shown, disc 14 also typically includes an array of circular openings surrounding center opening 16 to be received over wheel mounting lugs on an axle spindle. A jacket or shell 18 of aluminum alloy or other metal of high heat conduction capacity is cast around liner 12 and around the periphery of disc 14 to join the disc and liner into a rigid unitary structure. Preferably, the periphery of disc 14 has apertured dovetail projections 20 for enhanced structural bonding and mechanical interlocking to jacket 18. Similarly, the outside cylindrical surface 22 of liner 12 is roughened for enhanced structural bonding to jacket 18.

A static casting mold 30 for manufacturing brake drums in accordance with the present invention is illustrated in FIGS. 2-3. Mold 30 includes axially opposing die sections 32, 34 at least one of which, preferably section 32, is movable with respect to the other in the direction of the horizontal mold central axis 35. A mandrel 36 is integrally coupled to the body of die section 32. A plurality of identical springs 40 are mounted by corresponding screws 42 in an evenly spaced circumferential array around a groove 44 in the radial face 46 of mandrel 36. As best appreciated from FIGS. 2 and 4, each spring is formed of wire spring stock, and includes a circular bead 48 clamped by the bead of a corresponding screw 42 and a pair of arcuate legs 54 extending radially outwardly and axially rearwardly from bead 48. The rounded nature of spring legs 54, as well as the arcuate configuration thereof, helps prevent scoring of the machined internal braking surface of the brake liner during mounting of the latter onto die section 32.

Face 52 of mandrel 36 is contoured complimentarily to receive disc 14 of desired cross section. A boss 76 projects axially from mandrel 36 and has a diameter for closely receiving and piloting disc 14 to a position coaxial with mold axis 35. The axially facing surface 78 of die section 34 is contoured for flush facing complimentary engagement with disc 14 in the closed position of the mold (FIG. 2). The periphery of die section 34 cooperates with the opposing surface of die section 32 and liner 12 in the closed position of the die sections for defining a mold cavity 84 (FIG. 2) for casting of aluminum jacket 18. Die section 34 includes suitable sprue openings 90 for injection of molten metal into the mold cavity. In the closed position of mold sections 32, 34 illustrated in FIG. 2, the back edge 92 is held against the opposing surface of section 32 by dovetails 20, and a lip 94 on the front inside edge of liner 12 cooperates with an opposing conical surface 96 in mandrel 36 to prevent flow of molten material into groove 44. Thus, liner 12 functions as one wall of the jacket mold cavity.

In operation, with die sections 32, 34 open, a preformed and premachined liner 12 is first fitted axially over outer face 46 and springs 40 so as to compress the latter radially inwardly from the phantom illustration in FIG. 2 to the position illustrated in solid lines. The diameter of mandrel peripheral face 46 is less than the nominal inside diameter of liner 12 by an amount sufficient to accommodate a slight flattening of the liner (a few thousandths of an inch) into an oval configuration. The multiplicity of springs 40, together with the arcuate configuration of spring legs 54, gradually urge the liner into the intended and desired true circular configuration as the liner is located over the mandrel. The springs additionally function to center liner 12 to the mold axis 35 (FIG. 2).

Disc 14 is then located on mandrel 36 and die section 32 is moved into engagement with section 34. Before injection of molten metal, the mold, liner and disc must be at a temperature sufficient to prevent premature chilling of the molten metal. For a jacket 18 of aluminum, a minimum preheat temperature of 450° F. is suitable. Molten metal is then injected into cavity 84 (FIG. 2) through pour opening 90 and allowed to cool to a temperature at which die sections 32, 34 may be opened, and the finished drum removed.

From the foregoing description, it will be apparent that the apparatus and method herein disclosed fully satisfies the objects and aims previously set forth. In particular, mandrel 36, specifically springs 40, accurately position the cylindrical braking surface of liner 12 coaxially with the axis of disc 14. Additionally, liner 12 and disc 14 are accurately positioned coaxially with the cavity 84 in which the drum jacket is cast. The method and mold of the invention are particularly well adapted for accommodating the preferred less-expensive liners of relatively thin wall thickness without inducing fractures or cracks in the liner. It will be apparent that the method and apparatus of the invention are readily adapted for manufacture of two-element drums wherein the shell and mounting disc are cast as one unit around the brake liner. It is also contemplated that the centering mandrel of the invention could be utilized in a mold for centrifugally casting the jacket around a preformed brake liner.

The invention claimed is:

1. Molding apparatus for manufacturing brake drums of the type which include a preformed brake liner in the form of an annular hoop and a shell cast around said liner, said apparatus comprising a pair of die sections which collectively define a mold cavity having a central axis in a closed position of said die sections, and a centering mandrel carried by one of said die sections for receiving a brake liner so as to define one wall of said cavity, said centering mandrel comprising spring means disposed in a circumferential array around a radial portion of said mandrel for engaging the braking surface of a liner mounted on said mandrel so as to center said liner with respect to said axis.

2. The apparatus set forth in claim 1 wherein said spring means comprises a plurality of compression springs carried by said mandrel and including means adapted to be engaged by a preformed liner as said liner is mounted onto said mandrel for compressing said springs, such that said springs resiliently bear against said braking surface and conjointly center said liner.

3. The apparatus set forth in claim 2 for forming brake drums of the type which includes a said liner and shell and a preformed disc back spanning said shell and liner for mounting said brake drum to a vehicle, said apparatus further comprising means carried by said one die section for fixturing a said preformed disc back coaxially with said axis such that the periphery of said disc back is disposed within said mold cavity in said closed position of said die sections.

4. A method of manufacturing brake drums of the type which include a preformed brake liner and a shell cast around said liner, said method comprising the steps of:
 (a) providing a pair of die sections, at least one of which is movable with respect to the other along an axis common to said die sections between an open position and a closed position in which said die sections cooperate to form a mold cavity for said shell, one of said die sections including a mandrel with radially oriented self-centering means carried thereon and adapted for internal engagement with a brake liner,
 (b) with said die sections open, locating a said preformed brake liner on said mandrel over said self-centering means such that said means cooperates with said liner to fixture said liner in a substantially cylindrical configuration coaxially with said axis,
 (c) closing said die sections such that said brake liner is fixtured within said cavity to form one wall of said cavity, and then
 (d) casting said shell within said cavity around said brake liner.

5. The method set forth in claim 4 wherein said drum includes a preformed disc spanning said liner and shell, and wherein said method comprises the additional step of:
 (e) locating a said preformed disc on said one die section prior to closing of said die sections such that said disc is fixtured when said die sections are closed in said step (c) coaxially with said cavity with a peripheral edge of said disc disposed in said cavity.

6. The method set forth in claim 4 or 5 wherein said step (a) includes the step of mounting a plurality of radially compressible spring means as self-centering means on said mandrel for internally engaging and centering a said liner.

* * * * *